United States Patent [19]

Reed

[11] 4,148,064
[45] Apr. 3, 1979

[54] JAMMING CIRCUIT FOR TELEVISION SIGNALS

[75] Inventor: Frederick F. Reed, El Paso, Tex.

[73] Assignee: GTE Sylvania Incorporated, Stamford, Conn.

[21] Appl. No.: 868,035

[22] Filed: Jan. 9, 1978

[51] Int. Cl.² .............................................. H04N 1/44
[52] U.S. Cl. .................................... 358/118; 325/132; 358/121
[58] Field of Search .................. 358/118, 121; 325/132

[56] References Cited

U.S. PATENT DOCUMENTS

| | | | |
|---|---|---|---|
| 3,347,982 | 10/1967 | Bass et al. .............................. | 358/118 |
| 3,896,262 | 7/1975 | Hudspeth et al. ................... | 358/118 |
| 4,064,536 | 12/1977 | Saeki et al. ............................ | 358/118 |
| 4,074,311 | 2/1978 | Tanner et al. ........................ | 358/118 |
| 4,085,422 | 4/1978 | Niwata et al. ........................ | 358/118 |

Primary Examiner—S. C. Buczinski
Attorney, Agent, or Firm—Theodore D. Lindgren

[57] ABSTRACT

A circuit for transmitting a jamming signal for disruption of a television signal transmitted along a cable or other guided path toward a television receiver, the circuit having a first oscillator means providing an audio frequency signal which is used to frequency modulate a second oscillator means between the signal video and audio carrier frequencies inclusively and having a third oscillator means providing square-wave horizontal-sweep-frequency signal which is used with an amplitude-modulating means for amplitude-modulating the output of the second oscillator means to produce a jamming signal for directional coupling into the guided path for the purpose disrupting both audio and video content of the television signal.

4 Claims, 1 Drawing Figure

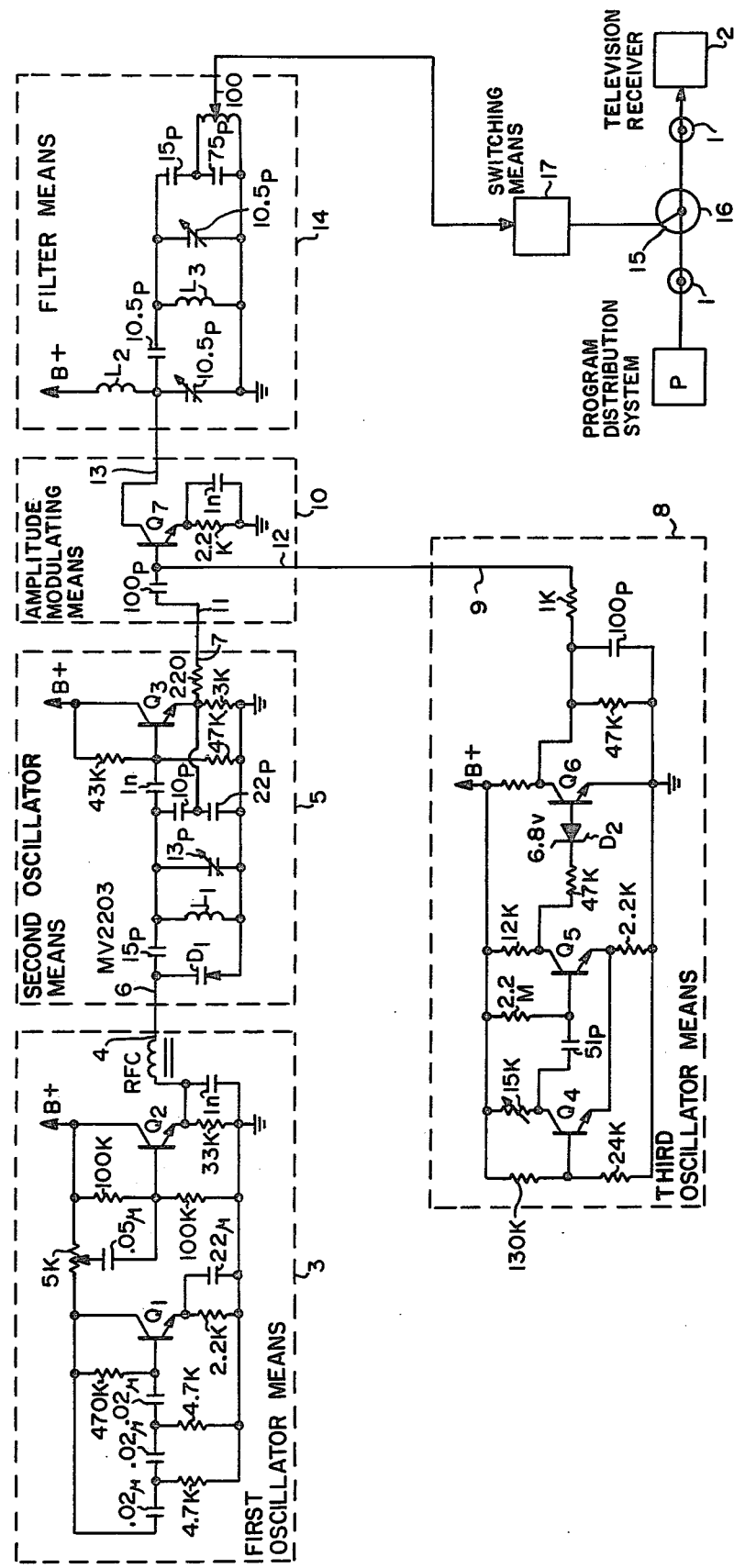

JAMMING CIRCUIT FOR TELEVISION SIGNALS

FIELD OF THE INVENTION

This invention relates to a circuit for jamming or rendering unusable a television signal transmitted along a cable or other guided path.

BACKGROUND OF THE INVENTION

Television signal control devices and circuitry designed for use in distributing television signals to viewer locations through cable systems are often required to have the capability for selective disablement by the distributor or viewer of a particular television channel without affecting the transmission of other channels throughout the system. Such disabling or jamming circuits, for example, give the viewer the option to purchase and the distributor the option to sell premium television programming. The disabling circuitry must, for economic reasons, be located in the proximity of the subscriber's home but may be activated or de-activated either by service call or, where addressable taps are used, by remote control.

The standard NTSC television broadcast channel has an allocated bandwidth of 6 MHz. The video carrier frequency is 1.25 MHz above the lower channel edge and is amplitude modulated to convey picture and synchronizing information in an approximate 4 MHz range above the carrier frequency. Chroma information is generally centered about a sub-carrier frequency located 3.58 MHz above the video carrier frequency. The audio signal is transmitted by frequency modulation of the sound carrier frequency, which is located 4.5 MHz above the video carrier frequency, leaving 0.25 MHz between the sound carrier frequency and the upper channel edge.

Selective channel control requires that one or more of the carrier frequencies of the signal be perturbed or filtered in some manner. Methods previously used for channel control have included video carrier traps, modulated video carrier traps and continuous wave frequency jamming.

Video carrier traps are generally very narrow, high-Q, notch filters tuned to the video carrier frequency and having a notch depth with order of 50 Db of attenuation. When switched into the signal path feeding the subscriber location, the trap causes an attenuated signal which results in presentation of a noisy and distorted picture on the jammed channel. Unfortunately, the carrier trap often adversely affects the sound and the picture on the lower adjacent channel and often does not remove the audio on the channel to be controlled. Therefore, carrier trap systems are generally limited to use with the lower frequency VHF channels or to use with channels in which a lower adjacent audio signal does not exist.

Modulated carrier traps are simply notch filters which are similar to those described in the preceding paragraph but which are switched into and out of the subscriber signal path at typical frequency rates of 30 Hz, 60 Hz or 15,750 Hz, resulting in square-wave modulation of the received video signal. Because television receivers are tuned to operate with vertical and horizontal sweep synchronizing information having frequencies of 60 Hz and 15,750 Hz, the modulated trap disrupts operation of the synchronizing and sweep circuits resulting in picture distortion. However, the switching of the trap usually produces a small but visible amount of interfering modulation on the lower and perhaps the upper adjacent channels. Furthermore, if the trap is made narrow enough to avoid adjacent channel interference, the sound portion of the controlled channel may continue to be transmitted.

Continuous wave frequency jamming may be accomplished by directional coupling of a video carrier frequency into the signal path directed to the subscriber location. The continuous wave frequency may be amplitude modulated at sweep frequency rates to further disrupt the viewed picture. However, neither the continuous wave jamming frequency nor the modulated continuous wave jamming frequency will remove the audio content from the signal transmitted to the subscriber location.

Another method which has been used to secure a premium channel is the insertion at the system transmitter location of a signal having a frequency located between the video and chroma carrier frequencies, the signal being modulated to produce a relatively narrow-band interference spectrum which produces both video and audio distortion. The jamming signal is removed for paying subscribers by introducing an equivalently narrow-band notch filter at the input to the television set. Unfortunately, this system offers limited security against unauthorized access since a non-paying subscriber may surreptitiously filter out the jamming signal, thus defeating its intended purpose.

SUMMARY OF THE INVENTION

The circuit of this invention provides a jamming signal which renders a television signal unviewable while at the same time jamming the audio signal of the controlled channel. In addition, the jamming signal supplied by the circuit may not be removed surreptitiously by unauthorized subscribers. Adjacent channels are unaffected by the jamming signal.

The jamming signal provided by the circuit has a peak amplitude approximately equal to the peak amplitude of the video carrier of the secured channel and has a center frequency located approximately at midpoint between the video and audio carrier frequencies. The signal is symmetrically swept or frequency modulated at audio frequency rate about the center frequency. The frequency deviation during sweeping periods is such that at the extremes of the frequency excursions the jamming frequency coincides with the video and audio carrier frequencies but such that the extremes of the frequency excursions do not interfere with adjacent channel reception. The jamming signal is amplitude modulated with a square wave at a frequency approximately equal to the horizontal sweep frequency of 15,750 Hz, the modulation percentage being at least 90 percent.

The circuit, in its preferred embodiment, is comprised of a varactor-tuned oscillator which provides the necessary swept-frequency signal. The output of the oscillator is switched on and off at a 15,750 Hz rate to achieve amplitude modulation. The circuit is compact in size and may therefore be located in subscriber tap locations. In one form, the circuit output may be provided with a filter to prevent harmonics of the output signal from interfering with signals of other channels transmitted over the same cable.

As embodied, the circuit of this invention provides a signal which renders unusable both the video and audio content of the secured TV channel. The jamming signal output, because of its wideband sweep, cannot be effectively filtered out at the television set location without simultaneously affecting the video and audio carriers. Because the jamming signal associated with the circuit of this invention is contained within the secured channel frequency bandwidth, it has no effect on adjacent channels. The jamming signal circuit may be used with any channel transmitted in a cable system because the jamming circuit does not suffer from the Q-type limitations inherent in trap filter circuits which generally restrict their application to the lower VHF channel frequencies.

BRIEF DESCRIPTION OF THE DRAWING

The sole drawing is an example in partial block form of an embodiment of the circuit of this invention.

DESCRIPTION OF THE PREFERRED EMBODIMENT

For a better understanding of the present invention, together with other and further objects, advantages and capabilities thereof, reference is made to the following disclosure in conjunction with the accompanying drawing.

Referring to the drawing, there is shown in the sole FIGURE a preferred embodiment of this invention. The circuit shown provides a jamming signal which jams, renders unviewable or disrupts coherence of a television signal being transmitted from a program distribution system P or other guided path 1 toward at least one television receiver 2.

The nominal frequency component relationships for a typical NTSC television channel have been previously discussed. The television signal has a 6 MHz bandwidth with video, chroma and audio information components prescribed in accordance with government regulation. While government regulations also require for free-space transmission of television signals that those signals be located in certain assigned channels of the overall frequency spectrum reserved for television broadcasting, it is parenthetically noted here that those specific regulations do not apply to cable television systems. By government regulation, the channel video carrier frequency is always 1.25 MHz above the lower boundary of the channel. As previously mentioned, the channel audio carrier frequency is located 4.5 MHz above the channel video carrier frequency and therefore only 0.25 MHz below the upper boundary of the channel. The channel television signal also contains a frequency component of 15,750 Hz for the purpose of transmitting synchronizing information relating to horizontal deflection or sweep of the electron beam of television receiver 2.

The jamming circuit as embodied herein has a first oscillator means 3 which may be comprised of a feedback amplifier circuit with a 180-degree phase shift in both the amplifier path and the feedback path as exemplified by the one stage amplifier $Q_1$ with RC feedback path indicated in the drawing. The feedback path is tuned to result in a positive feedback signal at an audio frequency located at any point in the range appropriated by 50 Hz to 5000 Hz. Oscillator means 3 preferably has a buffered output terminal 4 with means for varying the amplitude of the sinusoidal output voltage at said terminal, the sinusoidal output voltage being hereinafter referred to as the first signal. The first signal may be buffered and varied, for example, as indicated by the emitter-follower stage $Q_2$ with 5-Kilohm resistor-tapped signal input shown in FIG. 2.

Second oscillator means 5 may also be comprised of an amplifier which may have one stage such as indicated by $Q_3$ and of a feedback network designed to result in positive feedback at channel frequencies. In the example of the drawing, the emitter voltage output of transistor $Q_3$ is fed back through a tuned LC network to the base of said transistor. The feedback voltage has the proper phase relationship for oscillation near the frequency where inductor $L_1$ and the equivalent capacitance in parallel therewith reaches resonance. Inductor $L_1$ is constructed from 9 turns of number 24 wire 0.185 inches in diameter. The frequency of oscillation may be varied by varying through use of varactor $D_1$ equivalent capacitance in parallel with inductor $L_1$. The equivalent capacitance and therefore the oscillation frequency change with voltage applied to varactor $D_1$ through frequency control terminal 6. The voltage at output terminal 7 is referred to hereinafter as the second signal and is a substantially sinusoidal voltage which is frequency modulated by the first signal from first oscillator means 3 between the video carrier frequency of the jammed television signal and the audio carrier frequency of the jammed channel inclusively. The values of circuit components given in the drawing are designed to jam a standard broadcast channel number 3 by sweeping between the audio and video carriers thereof. The frequency sweep range may be adjusted to include both carriers by trimming of the 13 picofarad capacitor of oscillator means 5 and of the 5 Kilohm potentiometer of oscillator means 3.

Third oscillator means 8 may be comprised, for example, of a free-running multivibrator such as that formed by transistors $Q_4$ and $Q_5$. Adjustment of the indicated 15 Kilohm variable resistor is made to cause third oscillator means 8 to oscillate at substantially 15,750 Hz, the nominal line sweep frequency of the jammed television signal. The voltage signal at the collector of transistor $Q_5$ is level shifted by Zener diode $D_2$ and transistor $Q_6$ such that the voltage at output terminal 9 varies in square-wave form between essentially zero volts and one half of B+ voltage. The output voltage at terminal 9 is designated hereinafter as the third signal.

Amplitude-modulating means 10 may be comprised of an amplifier stage such as that indicated by $Q_7$ in the drawing. First input terminal 11 of means 10 is coupled to output terminal 7 of second oscillator means 5. The second signal from means 5 is transmitted through 100 picofarad coupling capacitor to the base of transistor $Q_7$. Second input terminal 12 of means 10 is coupled to the output terminal 9 of third oscillator means 8.

The third signal from means 8 is transmitted directly to the base of transistor $Q_7$. The emitter of transistor $Q_7$ is held at a small positive value of voltage by a 2.2 Kilohm emitter resistor and a parallel-connected 1 nanofarad capacitor. The third signal acts to alternately forward bias and reverse bias the base-emitter junction of transistor $Q_7$, therefore amplitude modulating the second signal by allowing transmission only during periods of time in which transistor $Q_7$ is forward biased. In practice, it has been determined that the amplitude of the jamming signal during modulation should be less than 10% of the modulated amplitude. Output terminal 13 of means 10 provides the desired jamming signal for disrupting transmission of a controlled or premium-channel television picture signal.

Optional filter means 14 may be to couple output terminal 13 to input terminal 15 of directional coupling means 16 to prevent possible harmonics of the jamming signal from disrupting transmission through cable 1 of television picture signals on other channels. The filter shown in the drawing is of standard LC construction with L$_2$ and L$_3$ constructed from 10 turns of number 24 wire 0.185 inches in diameter. The output signal level of the filter may be adjusted through use of the indicated 100 ohm terminating tapped resistor to equal the approximate level of the unmodulated video carrier frequency of the disrupted television signal.

In the preferred mode of operation of the jamming signal provided by the circuit of this invention is used to jam transmission of a television signal to more than one household or one television receiver. During such operation, the signal generating circuit is located at a point where cables branch out to several receiving locations. A directional-coupling means 16 is placed in each branch and switching means 17 are used to couple the jamming signal to only those directional-coupling means located in branches leading to non-subscribing locations. Preferably, the switching means either are readily accessible to servicemen or are remotely controlled in order that the premium programming option may be readily transmitted or jammed upon agreement of the contracting parties.

The circuit illustrated in the drawing indicates separate power supplies and grounds for each major circuit element described. As is well known in the art, common potential sources may be used for the entire circuit. However, it is necessary in some cases to use separate filtering of the common power supply for certain major elements such as amplitude-modulating means 10.

The foregoing embodiment is descriptive of the principle of the invention. Obviously, there are many equivalent circuits which may be used to embody specific major elements of the primary circuit disclosed.

I claim:

1. A circuit for transmitting a jamming signal for disrupting coherence of a television signal which is transmitted along a guided path toward at least one television receiver, said television signal having a video-carrier-frequency component, an audio-carrier-frequency component and a horizontal-sweep-frequency component, said circuit comprising:

a first oscillator means having an output terminal providing a first signal having a substantially sinusoidal voltage time varying at an audio-frequency rate;

a second oscillator means having a frequency-control terminal coupled to said output terminal of said first oscillator means, and having an output terminal providing a second signal having a substantially constant-amplitude sinusoidal voltage frequency modulated by said first signal between the frequency of said video-carrier-frequency component and the frequency of said audio-carrier-frequency component inclusively;

a third oscillator means having an output terminal providing a third signal having a substantially square-wave voltage time varying at substantially the frequency of said horizontal-sweep-frequency component;

an amplitude-modulating means having a first input terminal coupled to said output terminal of said second oscillator means, having a second input terminal coupled to said output terminal of said third oscillator means and having an output terminal providing said jamming signal comprised of said second signal amplitude modulated by said third signal with maximum amplitude substantially equal to the unmodulated amplitude of said video-carrier frequency component and minimum amplitude substantially equal to less than ten percent of said maximum amplitude;

directional-coupling means having an input terminal and a directional-output terminal, said input terminal of said directional-coupling means coupled to said output terminal of said amplitude-modulating means and said directional-output terminal of said directional-coupling means coupled to said guided path to direct said jamming signal toward said one television receiver.

2. The circuit of claim 1 in which said output terminal of said second oscillator means and said input terminal of said directional-coupling means are coupled by a filter means, said filter means having a pass-band with the frequency ranging between said video-carrier frequency and said audio-carrier frequency inclusive.

3. The circuit of claim 1 in which said output terminal of said second oscillator means and said input terminal of said directional-coupling means are coupled by a switch means.

4. The circuit of claim 1 in which said output terminal of said second oscillator means and said input terminal of said directional-coupling means are coupled by a filter means and a switch means, said filter means having a pass-band in the frequency range which includes said video-carrier frequency and said audio-carrier frequency.

* * * * *